US010423466B2

(12) United States Patent
Tummala et al.

(10) Patent No.: US 10,423,466 B2
(45) Date of Patent: Sep. 24, 2019

(54) OPTIMIZED STREAMING IN AN UN-ORDERED INTERCONNECT

(71) Applicant: ARM Limited, Cambridge (GB)

(72) Inventors: Ashok Kumar Tummala, Cedar Park, TX (US); Jamshed Jalal, Austin, TX (US); Paul Gilbert Meyer, Rollingwood, TX (US); Dimitrios Kaseridis, Austin, TX (US)

(73) Assignee: Arm Limited, Cambridge (GB)

( * ) Notice: Subject to any disclaimer, the term of this patent is extended or adjusted under 35 U.S.C. 154(b) by 361 days.

(21) Appl. No.: 15/296,283

(22) Filed: Oct. 18, 2016

(65) Prior Publication Data
US 2017/0168876 A1 Jun. 15, 2017

(30) Foreign Application Priority Data

Dec. 15, 2015 (GR) .............................. 20150100540
Mar. 24, 2016 (GB) .................................. 1605045.2

(51) Int. Cl.
G06F 9/46 (2006.01)
G06F 9/52 (2006.01)
G06F 9/50 (2006.01)
H04L 29/06 (2006.01)

(52) U.S. Cl.
CPC ................ *G06F 9/524* (2013.01); *G06F 9/50* (2013.01); *H04L 29/06476* (2013.01)

(58) Field of Classification Search
CPC .......... G06F 9/524; G06F 9/50; G06F 9/5038; G06F 9/5005; G06F 9/5027; H04L 29/06476; H04L 29/08945
See application file for complete search history.

(56) References Cited

U.S. PATENT DOCUMENTS

| 6,278,712 | B1 * | 8/2001 | Takihiro | H04L 47/2416 |
| | | | | 370/356 |
| 6,321,260 | B1 * | 11/2001 | Takeuchi | H04L 47/724 |
| | | | | 709/223 |
| 7,701,914 | B1 * | 4/2010 | Beser | H04L 47/724 |
| | | | | 370/341 |
| 7,840,116 | B2 * | 11/2010 | Suzuki | H04N 5/76 |
| | | | | 386/291 |
| 8,254,317 | B2 * | 8/2012 | Gu | H04W 76/12 |
| | | | | 370/329 |
| 9,094,899 | B2 * | 7/2015 | Smith | H04W 48/17 |
| 9,372,798 | B2 * | 6/2016 | Flanders | G06F 12/0831 |
| 9,451,552 | B2 * | 9/2016 | Lim | H04B 7/022 |
| 9,953,351 | B1 * | 4/2018 | Sivasubramanian | |
| | | | | G06Q 30/0283 |

(Continued)

OTHER PUBLICATIONS

A. Radulescu et al., "An efficient on-chip NI offering guaranteed services, shared-memory abstraction, and flexible network configuration," in IEEE Transactions on Computer-Aided Design of Integrated Circuits and Systems, vol. 24, No. 1, pp. 4-17, Jan. 2005. doi: 10.1109/TCAD.2004.839493.

(Continued)

*Primary Examiner* — Hiren P Patel
(74) *Attorney, Agent, or Firm* — Leveque IP Law, P.C.

(57) ABSTRACT

A method, system, and device provide for the streaming of ordered requests from one or more Senders to one or more Receivers over an un-ordered interconnect while mitigating structural deadlock conditions.

18 Claims, 5 Drawing Sheets

(56) References Cited

U.S. PATENT DOCUMENTS

| | | | |
|---|---|---|---|
| 2001/0029519 A1* | 10/2001 | Hallinan | G06F 9/5016 718/104 |
| 2002/0059432 A1* | 5/2002 | Masuda | H04L 47/2408 709/227 |
| 2002/0091810 A1* | 7/2002 | Hundscheidt | H04L 47/15 709/223 |
| 2003/0005130 A1* | 1/2003 | Cheng | H04L 12/2805 709/228 |
| 2003/0046602 A1* | 3/2003 | Hino | G06F 11/2033 714/4.4 |
| 2004/0186864 A1* | 9/2004 | Hsu | G06F 9/5011 708/100 |
| 2005/0117587 A1* | 6/2005 | Kawato | G06F 9/5027 370/395.21 |
| 2007/0266388 A1* | 11/2007 | Jackson | G06F 9/5027 718/104 |
| 2008/0028090 A1 | 1/2008 | Sophana et al. | |
| 2009/0138882 A1* | 5/2009 | Anand | G06F 9/5027 718/104 |
| 2010/0121904 A1* | 5/2010 | Karo | G06F 9/485 709/202 |
| 2010/0189125 A1* | 7/2010 | Song | H04L 41/5019 370/437 |
| 2010/0262972 A1 | 10/2010 | Cocks et al. | |
| 2011/0078313 A1* | 3/2011 | Radulescu | H04L 45/125 709/227 |
| 2011/0289175 A1* | 11/2011 | Lee | H04W 28/26 709/208 |
| 2012/0102498 A1* | 4/2012 | Subramanya | G06F 9/50 718/104 |
| 2012/0106463 A1* | 5/2012 | McBride | H04W 28/24 370/329 |
| 2013/0042249 A1* | 2/2013 | Jalal | H04L 47/70 718/103 |
| 2013/0166644 A1* | 6/2013 | Sun | H04L 5/0094 709/204 |
| 2015/0043383 A1* | 2/2015 | Farkas | H04L 45/22 370/254 |
| 2015/0089509 A1 | 3/2015 | Brown et al. | |
| 2016/0014044 A1* | 1/2016 | Mangin | H04L 47/724 370/329 |

OTHER PUBLICATIONS

Bjerregaard, Tobias; Mahadevan, Shankar / A survey of research and practices of network-on-chip. In: Acm Computing Surveys, vol. 38, No. 1, 2006, p. 1-51.

\* cited by examiner

OPTIMIZED STREAMING IN AN UN-ORDERED INTERCONNECT

BACKGROUND

In a distributed data processing system having many types of processors, devices and peripherals in communication, an interconnect may be used to facilitate system communications. This is particularly the case with more complex integrated circuit systems, such as System-on-Chip (SoC) circuitry, which transports ever more data using a dedicated interconnect structure. Transaction requests between devices of the system flow through the interconnect, often taking unpredictable routes, which may change the order in which transaction requests are received and executed by devices receiving transaction requests. Such changes to the ordering of transaction requests can be unpredictable and have an unacceptable impact on system performance.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
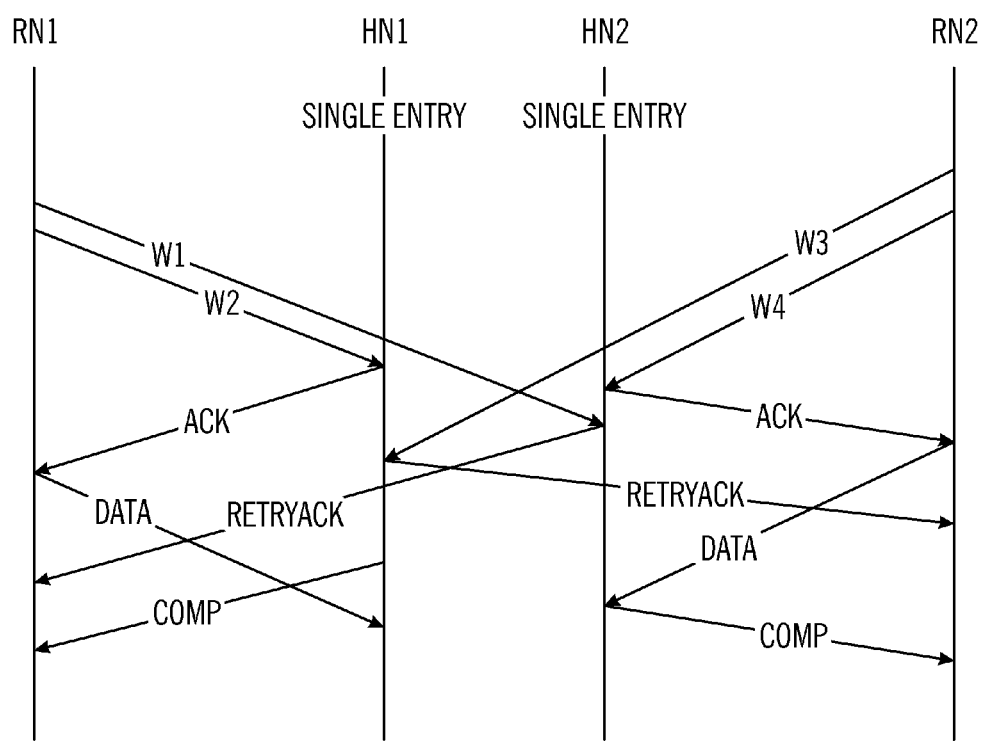
FIG. 1 is a transaction request flow diagram.

The various methods, systems, apparatus, and devices described herein provide for streaming of ordered requests from one or more Senders to one or more Receivers over an un-ordered interconnect while mitigating structural deadlock conditions.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In accordance with various embodiments disclosed herein, one or more Senders can stream ordered transaction requests to be executed at a Receiver in an un-ordered interconnect at high performance (optimized streaming) while mitigating the occurrence of structural deadlocks. As used herein, the term Sender or Senders may refer to request nodes, or requesters, (RNs, RN-Is), initiator devices, sources or other transaction generating devices that stream transaction and reservation requests in any particular order in an un-ordered interconnect to one or more Receivers. As any device that generates transactions and requests, then, a Sender could be a master or initiator device in a data processing system, such as a data processor, a graphics engine, a graphics pose processor (GPP), a processing element or core, clusters of processing cores, input/output (I/O) masters, a digital signal processor (DSP), a field programmable gate array (FPGA) or an application specific integrated circuit (ASIC) device), by way of example and not limitation. Moreover, transaction requests may be generated by a Sender, or received by a Sender from another device and then transmitted via an un-ordered interconnect to a Receiver. Reservation requests transmitted by a Sender are requests to reserve one or more resources needed by a Receiver to execute received transaction requests. Though the transaction requests may be sent or received in any or no particular order over the un-ordered interconnect, the received transaction requests must be executed by a Receiver in an order known to the Sender but not the Receiver. A Receiver may be any device, such as a home node (HN) or target, which receives reservation and transaction requests, and executes transaction requests in the order known to one or more Senders. As such, a Receiver may be an intermediate device such as a coherency controller or another interconnect that receives a transaction request or a reservation request, or it may be the final destination of a transaction request. A transaction request may be a request to update the state of a resource by the Receiver; examples of transaction requests include memory read or write requests, such as ordered writes, ordered reads, and invalidate requests, and requests to access memory-mapped peripheral devices. A "resource", "data resource", "buffer resource" or the like can be accessed by multiple devices and has associated with it a state that can be updated or changed. Examples of a resource include a byte of memory, a bit in a register, etc.

As used herein memory may be any suitable storage technology such as a random access memory (RAM), Read Only Memory (ROM), Flash memory, Electrically Erasable Programmable Read Only Memory (EEPROM), mass storage such as a hard disc drive, floppy disc drive, optical disc drive or may accommodate other electronic storage media, and non-volatile memory (NVM). The memory may be active memory or may permanently reside in ROM, EEPROM or Flash memory, for example.

Ordered Requests

Streaming of ordered transaction requests in an un-ordered interconnect is a challenging task. One way to enforce ordering is to wait for some kind of acknowledgement from the target (receiver) before sending the next ordered transaction request. This limits the performance of the ordered stream where the achieved bandwidth is determined by the latency of the acknowledgement. Performance can get worse if the ordered transaction requests need to be globally observed (GO) in order. Examples of ordered transaction requests include ordered writes, ordered reads, and invalidate requests.

Write Request Ordering

In write request ordering, writes may be required to be GO in order. Consider, for example, a Producer/Consumer ordering model where a Producer produces/writes the data in memory and sets a flag. The Consumer of the data polls on the flag and when there is an updated flag the updated/latest data is available. In this ordering model the write to data and write to flag from the producer are required to be GO in order.

Attempts to order requests over an un-ordered interconnect, however, may nonetheless fail to avoid structural deadlocks. Serialization, for example, may require a wait for a previous ordered write to complete; serialization performance may be described as 1/(completion latency). Additionally, streaming may require a wait for some kind of early acknowledgement before the next ordered request can be dispatched. Such an early acknowledgement must guarantee that the write is GO; if not, then GO order must be controlled by some other mechanism. Performance of this type of streaming may be expressed as 1/(early acknowledgement latency). In enterprise class systems and other high performance environments, however, the performance achieved by this type of streaming mechanism might not be acceptable. Where it is not desired to wait for an early acknowledgement before transmitting the next ordered request, there is the concern of structural deadlock.

In particular, streaming of ordered requests from one or more Senders (requester devices) to one or more Receivers over an un-ordered interconnect can result in structural deadlock. A given Sender wishing to send a second ordered request to the same Receiver to which it sent a first ordered request must wait for an acknowledgement from that Receiver before transmitting the second ordered request in order to avoid structural deadlock. This approach obviously does not provide for optimized streaming.

Consider the following example that illustrates the occurrence of structural deadlock during streaming of ordered requests from more than one Sender: first and second Senders Request Nodes RN1 and RN2. At RN1, write requests W1 and W2 belong to the same ordered stream where W2 needs to be ordered behind (executed after) W1; RN1 knows this required order. Write W1 is targeting Receiver Home Node HN1 while write W2 is targeting Receiver Home Node HN2. Since the writes W1 and W2 are targeting different Receivers, HN1 and HN2, they can be transmitted by RN1 without waiting for any acknowledgement. Similarly, at RN2, write requests W3 and W4 belong to the same ordered stream where W4 needs to be ordered behind (executed after) W3; RN2 knows this required order. Write W3 is targeting Receiver Home Node HN1 while write W4 is targeting Receiver Home Node HN2. Since the writes W3 and W4 are targeting different Receivers, HN1 and HN2, they can be transmitted by RN2 without waiting for any acknowledgement. There is no structural deadlock in this case.

Next consider the case where each Receiver, HN1 and HN2, has a single entry to serve these write requests. W2 gets accepted in the single entry buffer of HN1. W3 retries for target HN1 (RetryAck). An acknowledgment is sent by HN1 to RN1 over the un-ordered interconnect for W2 and RN1 sends the data (Data) for W2. A completion of W2 (Comp) is sent by HN1 to RN1 when the snoops are complete. RN1 is waiting for completion of W1, however, to send a completion acknowledgment for W2, as W2 must be completed after W1. At HN2, W4 is accepted in the single entry buffer of HN2. Write W1 is retried (RetryAck). A completion response for W4 is sent by HN2 to RN2. RN2 sends data (Data) for W4. A completion of W4 (Comp) is sent by HN2 to RN2 when the snoops are complete. However, RN2 is waiting for completion of W3 before it can send a completion acknowledgment for W4, as W4 must be completed after W3. This is illustrated in the transaction request flow diagram of FIG. 1.

In both cases, the "younger" writes, W2 and W4, in their ordered chain from Senders RN1 and RN2, respectively, occupy the target HN buffer resource, HN1 and HN2, thereby preventing "older" writes W1 and W3, respectively, in the same ordered chains making any forward progress, resulting in a structural deadlock. Due to this structural deadlock, only one Sender RN1 can optimize stream writes at high performance. It can be seen from this example that the resulting structural deadlock prevents the older transaction request from resolving or making forward process.

In order to enable one or more Sender devices to optimally stream ordered requests, such as ordered writes, reads, invalidates, etc. at high performance, the detection of structural deadlocks and subsequent release of resources reserved for younger requests in one or more ordered chain breaks the structural deadlock conditions. Canceling the younger request in an ordered chain (the younger write in the above example) frees up the buffer resources in the target Receiver. Upon release of resources previously reserved for younger requests, older requests (writes) can then use the buffer resources to make forward progress. Canceled younger requests can then be sent again by their Sender after becoming the head of the ordered chain for that Sender device. Using this approach, ordered requests can be sent by Senders without waiting for any acknowledgement from the targeted Receiver, thereby allowing ordered requests to be pipelined.

The embodiments presented herein are superior to alternate solutions, such as implementing a cache at a Sender, such as a Request Node, and committing write requests to this cache. Such a caching scheme would require caching the RN with inbound snoops support, doubling the number of requests on the interconnect, and is therefore more expensive in terms of energy, power and area resources required. The request canceling embodiments described herein, conversely, simplifies the snoop filter, the Receiver implementation and the number of snoops required in the system.

Figure 2:
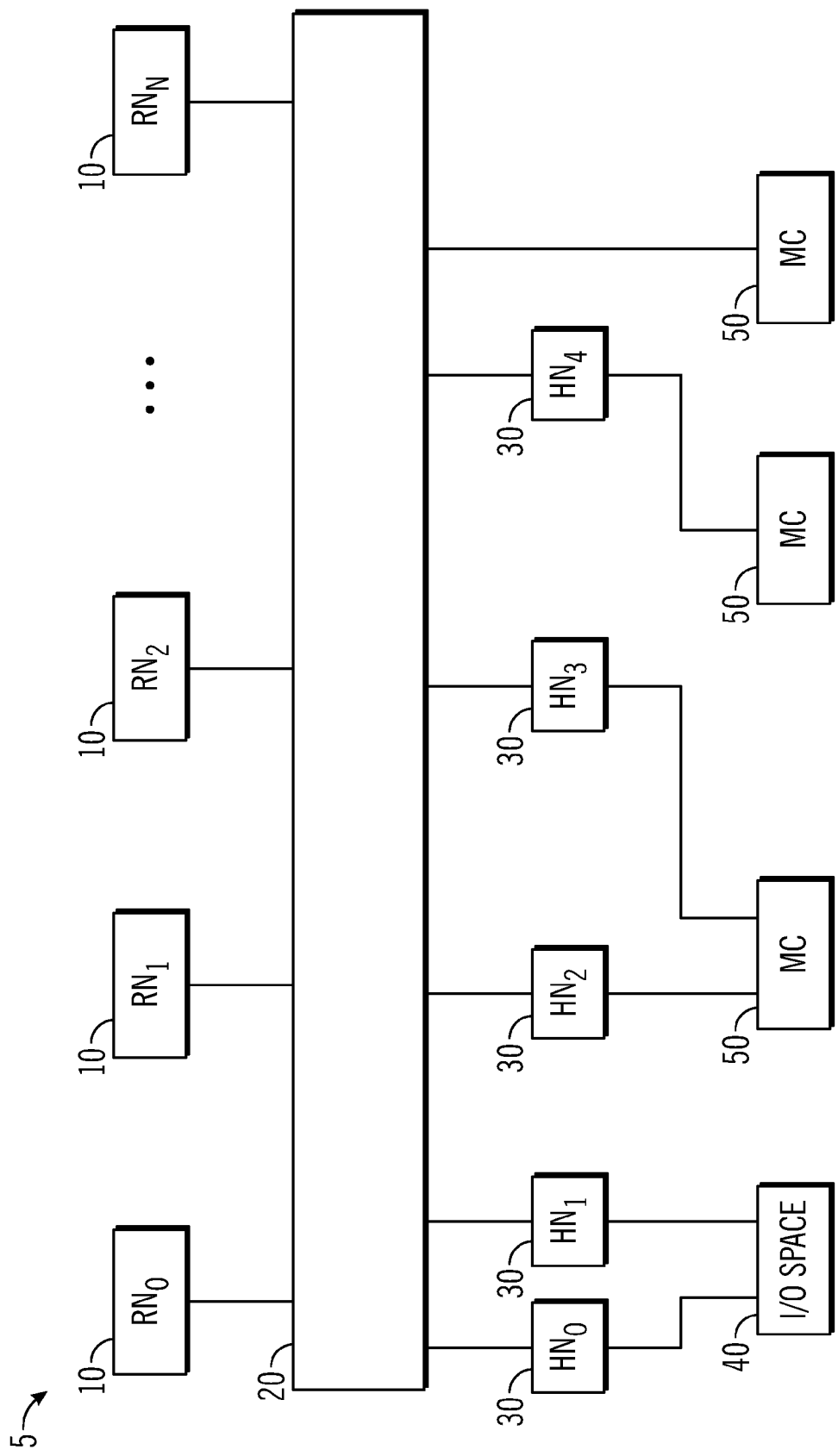
FIG. 2 is a block diagram of data processing system, in accordance with various representative embodiments.

In the distributed data processing system 5 of FIG. 2, a number of Senders 10, shown as request nodes or devices $RN_0, RN_1, RN_2 \ldots RN_N$, for example, are in communication via an un-ordered interconnect 20 with one or more Receivers 30, which are shown as Home Nodes $HN_0, HN_1, HN_2, HN_3, HN_4$. These Home Node Receivers may further be intermediate devices, or points of coherency, points of serialization (POC/POS) in the system, in communication with input/output space (I/O space) 40 and memory controllers (MC) 50 as shown. Transaction requests and reservation requests travel from Request Node Senders to the target Home Node Receivers 30 through interconnect 20. In the process of transmitting transaction and/or reservation requests over the un-ordered interconnect, the requests may be re-ordered or become un-ordered in interconnect 20; the requests may take different routes through interconnect 20 to reach the intended Receiver devices 30 such that they may overtake each other.

Figure 3:
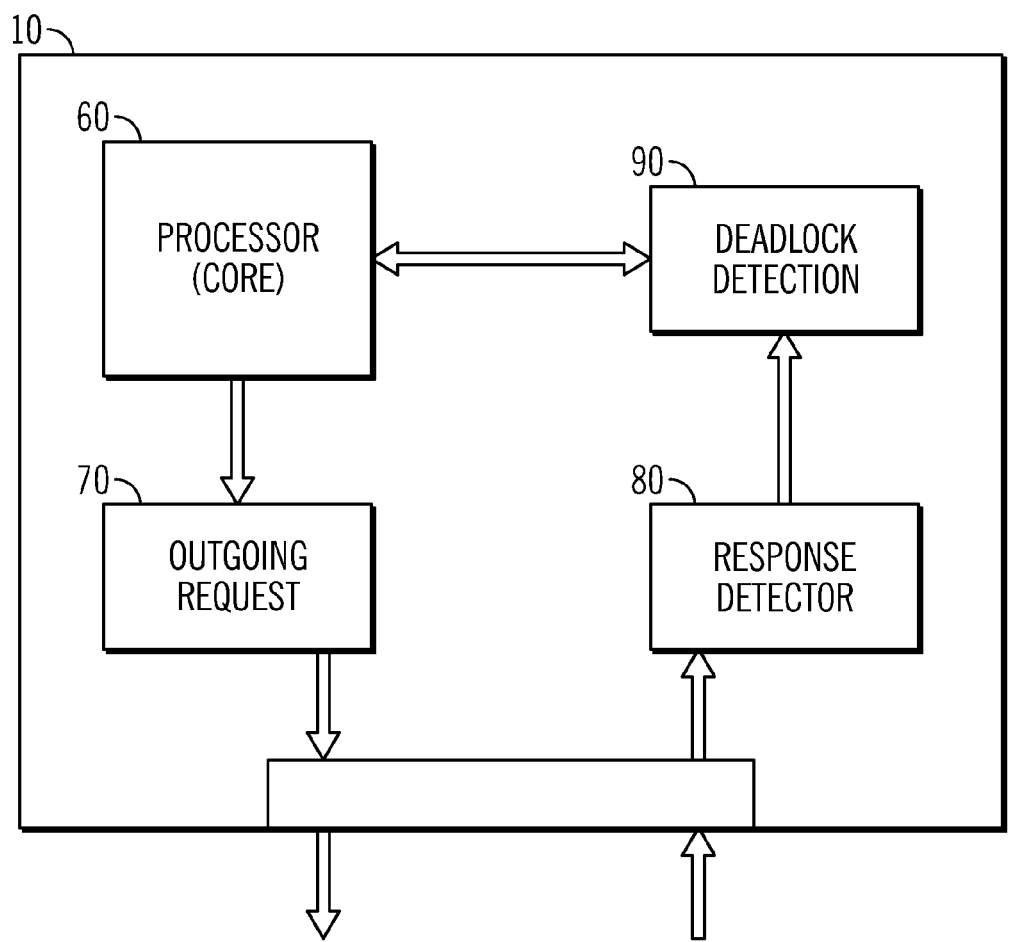
FIG. 3 is a block diagram of a sender device, in accordance with various representative embodiments.

Referring now to FIG. 3, an example of a Sender device 10 is shown, in accordance with various representative embodiments. Sender 10 in this embodiment has processing capabilities, with a processor (processing core) 60, an outgoing requests element 70, a response detector 80 and a deadlock detection element 90. Processing core 60 can generate transaction requests and reservation requests that may be stored, if needed, in outgoing requests buffer 70. As the approach described herein provides for the high performance pipelining of requests in which there is no need to wait for acknowledgement between transmission of requests, the arbiter function used in other types of Sender devices may not be needed.

Processor 60 may encompass a processor, controller, microcontroller unit (MCU), microprocessor, and other suitable control elements. It will be appreciated that embodiments of the invention described herein may be comprised of one or more conventional processors and unique stored program instructions that control the one or more processors to implement, in conjunction with certain non-processor circuits, some, most, or all of the functions described herein. The non-processor circuits may include, but are not limited to, a receiver, a transmitter, a radio, signal drivers, clock circuits, power source circuits, and user input devices. As such, these functions may be interpreted as a method to perform functions in accordance with certain embodiments consistent with the present invention. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Therefore, in accordance with various embodiments described herein, a Sender device is configured to transmit transaction requests and reservation requests in a data processing system 5. The Sender has a processor 60; an outgoing requests element 70 in communication with the processor; a deadlock detection element 90 in communication with the processor; and a response detector 80 in communication with the deadlock detection element and configured to receive incoming communications. Processor 60, which may be a data processor, a graphics engine, a graphics pose processor (GPP), a processing core, clusters of processing cores, input/output (I/O) masters, a digital signal processor (DSP), a field programmable gate array (FPGA) or an application specific integrated circuit (ASIC) device as has been described, controls outgoing requests element 70 to transmit in any order first and second reservation requests for reservation of one or more resources needed for execution of the first and second transaction requests.

Once the response detector 80 receives an acknowledgement of reservation of a resource, deadlock detection element 90 determines from the acknowledgment whether the resource is reserved due to the first reservation request or to the second reservation request and further correlates the determined first or second reservation request with a first transaction request or a second transaction request, as the defined order of the first and second transaction request is known by the Sender. If the deadlock detection element determines that the reserved resource is reserved for the second transaction request and that a second resource for the first transaction request is not reserved by the receiver within a period of time, the processor generate instructions to do the following:

release the resource reserved for the second transaction request;

reserve the second resource for the first transaction request and transmit a second acknowledgement of the reservation of the second resource; and execute the first transaction request using the reserved second resource.

Processor 60 then controls outgoing requests element 70 to transmit these instructions to the Receiver.

Figure 4:
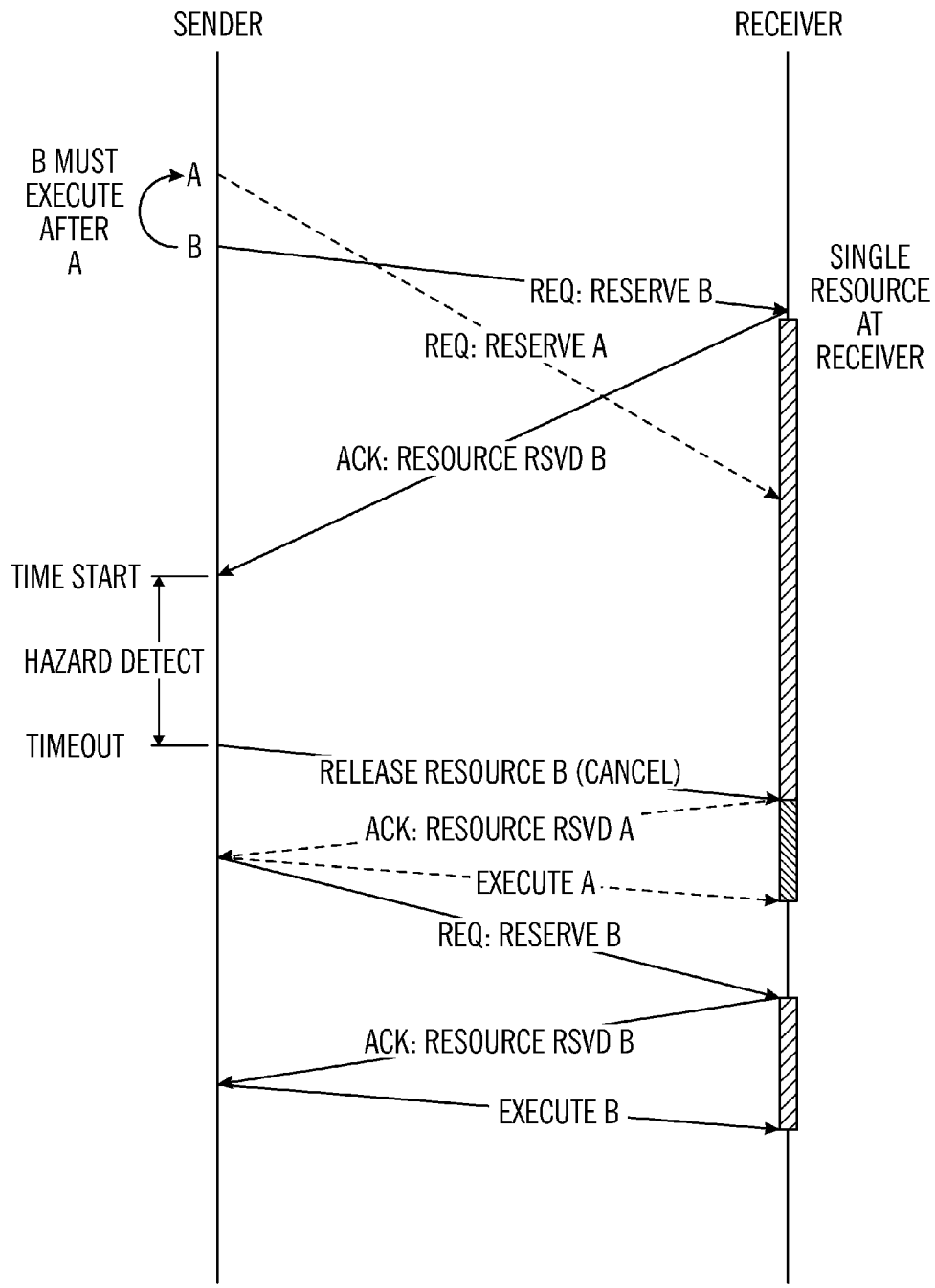
FIG. 4 is a transaction request flow diagram, in accordance with various representative embodiments.

Referring now to FIG. 4, a transaction request flow diagram, in accordance with various representative embodiments, is shown. In this example flow, the Sender device is denoted as "SENDER" while a Receiver device is denoted as "RECEIVER." As previously described, the Sender may be a source, a requester node, etc. while the Receiver may be a target, a home node, etc. The Sender has two transaction requests A and B. Transaction request B must be executed by the Receiver after transaction request A and is thus the "younger" transaction request in the ordered chain of transaction requests A and B. Only the Sender is aware of this order. The Sender sends requests to reserve resources at the Receiver for both Transactions A and B; these are shown as Req: Reserve A and Req: Reserve B in the drawing. As the Receiver has only a single resource available to service both these requests, there may be a deadlock condition, which is the case in this example. The Receiver receives the reservation request Req: Reserve B first, as shown in the timeline, and reserves the resource for Transaction B, and then sends an acknowledgement to the Sender: Ack: Resource Rsvd B. The Receiver thus blocks this resource for Transaction B and so does not have the resources to reserve for Transaction A.

At the Sender, the acknowledgment for reservation of the resource for Transaction B has been received but the Sender must wait to see if a similar acknowledgement of reservation of resources for Transaction A is received, as Transaction A must be executed by the Receiver before it can execute Transaction B. Therefore, during a period of time, the deadlock detect element of the Sender awaits acknowledgement of reservation of the resource(s) needed for Transaction A. If such acknowledgment is not forthcoming during this period of time, the presence of a structure or resource dependency problem at the Receiver that is consistent with the existence of a structural deadlock is indicated.

The detection of a deadlock event at the Receiver by the deadlock detect element of the Sender thus occurs during a period of time and the period of time may be counted by a clock or timer which is based on a fixed value (fixed), is programmable, or adaptive. It can be seen that in this particular example, a timer of fixed duration is started by the Sender upon receiving acknowledgement from the Receiver that the resource has been reserved for Transaction B but not for Transaction A. If, after some period of time, acknowledgement of reservation of the resource(s) needed for Transaction A is not received, then a structural deadlock is indicated. As shown in the block diagram of FIG. 3, the deadlock detection element of the Sender is configured to detect this hazard condition. In this example, the detection mechanism is based on a timeout.

After the period of time has elapsed, at the "Timeout" of the drawing, the Sender detects that the Receiver was not able to reserve a resource needed by Transaction A. The Sender instructs the Receiver to release the resource that has been reserved for Transaction B and reserve the resource for Transaction A: Release Resource B (Cancel). The Receiver releases the resource and accordingly sends an acknowledgement of the reservation for Transaction A to the Sender: Ack: Resource Rsvd A. The Sender thereafter instructs the Receiver to execute Transaction A and also to reserve the resource for Transaction B; these instructions may or may not occur at the same time. The Receiver sends back to the Sender an acknowledgement that the resource has been reserved for Transaction B: Ack: Resource Rsvd B, which in turn prompts the Sender to instruct the Receiver to execute Transaction B. In this way, the Sender controls the reservation of resources at the Receiver for Transactions A and B, if needed to ensure that execution of Transactions A and B occurs in the required order. Accordingly, even in a highly efficient, pipelined transmission of transaction requests over an un-ordered interconnect to a Receiver in which the required order of transaction execution is not known by the Receiver, optimized streaming is maintained.

Figure 5:
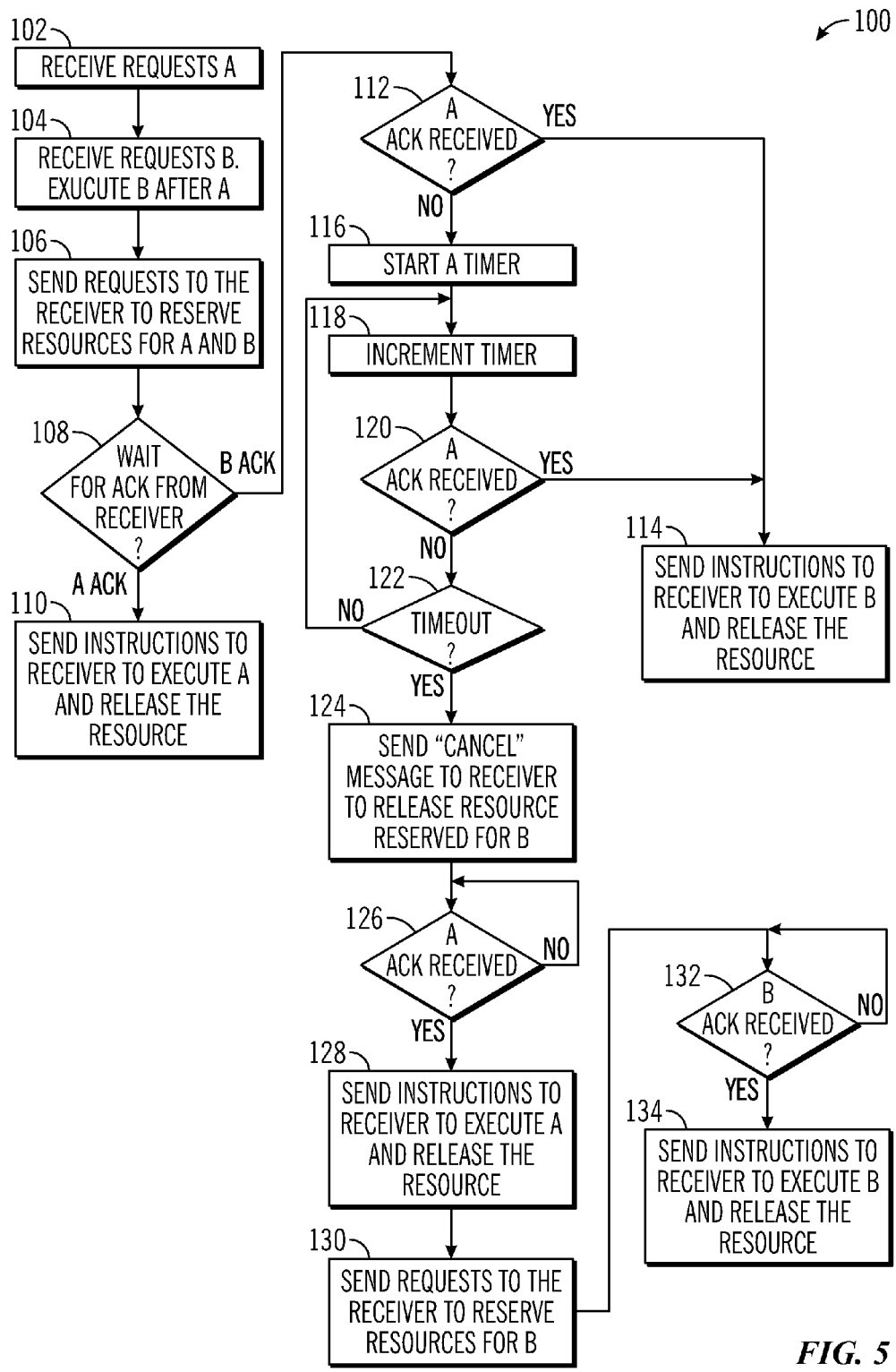
FIG. 5 is a flowchart that illustrates a method of streaming in an un-ordered interconnect, in accordance with various representative embodiments.

Referring now to FIG. 5, a flowchart 100 in accordance with certain representative embodiments is further illustrated. At Blocks 102 and 104, a Sender may receive a request for Transaction A and then a request for Transaction B; Transaction B is to be executed after Transaction A. In the case where the Sender receives Transactions A and B, they may be transmitted to the Sender by another device within the data processing system. For example, a master interface of a DMA controller that allows the controller to transfer data from a source slave to a destination slave device may send Transactions A and B to the Sender. The Sender may set the order of the transactions or that information may be received with the requests received at Blocks 102 and 104; the order of the transactions, then, is known to the Sender but not the Receiver. At Block 106, the Sender transmits the requests to the Receiver to reserve resources for Transactions A and B. As has been described, the transactions may be sent in any order to the Receiver over the un-ordered interconnect and in so doing, the order may be changed or re-ordered. At Decision Block 108, the Sender waits for an acknowledgement from the Receiver. If an acknowledgement that resources have been reserved for Transaction A is received (A Ack) by the Sender, then Sender sends instructions to the Receiver to execute Transaction A and releases the resource so that it can be used for another transaction, such as Transaction B, at Block 110.

If, however, an acknowledgement that resources have been reserved for Transaction B is received (B Ack) by the Sender, then the flow continues to Decision Block 112. If an acknowledgement that resources have been reserved for Transaction A is received (A Ack) by the Sender, then the Sender transmits instructions to the Receiver to execute Transaction B and release the resource at Block 114. If an A Ack still is not received by the Sender, then a timer is started at Block 116 and incremented at Block 118. Whether A Ack has been received is again checked at Decision Block 120. If yes, the flow goes to Block 114. If not, then the timer is incremented and again the deadlock detection element of the Sender waits for A Ack. If there is a timeout at Decision Block 12, the deadlock detection element determines that there is a deadlock condition. Thus, the detection of a deadlock condition at Blocks 112-112 may be implemented by a deadlock detection element of the Sender, as has been described.

The deadlock detection element is in communication with the processor of the Sender. Accordingly, upon detection of the deadlock condition by the deadlock detection element, the processor sends a "cancel" message to the Receiver to release the resource reserved for Transaction B at Block 124. An Ack is again checked at Decision Block 126; once it is received, the Sender sends instructions to the Receiver at Block 128 to execute Transaction A and then release the resource. The Sender sends another reservation request to the Receiver to reserve resources for Transaction B at Block 130. Decision Block 132 waits for B Ack to be received by the Sender. Once that has been received, then the Sender at Block 134 transmits instructions to the Receiver to execute Transaction B and thereafter release the reserved resource.

As has been described, measuring the duration of time may be accomplished in different ways and at different times. In addition to starting a timer after the "no" branch from Decision Block 112 to coincide with when a B Ack is received, the timer could alternately be started when either the Transaction A or the Transaction B is issued. Moreover, the timer may be based on a fixed value as in this flow, it could be programmable, or it could be adaptable and tied to historical happenings within the system, i.e. hysteresis.

In accordance with the embodiments disclosed herein, in order to enable one or more Sender devices to optimally stream ordered requests, such as ordered writes, reads, invalidates, etc. at high performance, the detection of structural deadlocks and subsequent release of resources reserved for younger requests in one or more ordered chain breaks the structural deadlock conditions. Canceling the younger request in an ordered chain (the younger write in the above example) frees up the buffer resources in the target Receiver. Upon release of resources previously reserved for younger requests, older requests (writes) can then use the buffer resources to make forward progress. Canceled younger requests can then be sent again by their Sender after becoming the head of the ordered chain for that Sender device. Using this approach, ordered requests can be streamed by one or more Senders without waiting for any acknowledgement from the targeted Receiver, thereby allowing ordered requests to be pipelined.

The performance associated with this request cancel approach is good; there are not too many request cancels expected, as the occurrence of deadlock conditions are not frequent, and so the overhead associated with the request cancel operation is minimal. For example, the bandwidths that can be achieved by one or more Senders streaming ordered writes or other ordered requests in a distributed data processing system with a 1 GHz clock frequency can be on the order of approximately 16 GB/s or more.

In accordance with certain embodiments of the present disclosure, there are provided various methodologies for optimized streaming of ordered requests from one or more Senders. Therefore, a method of optimized streaming in a data processing system comprises:

transmitting in any order first and second reservation requests for reservation of one or more resources over an un-ordered interconnect by a sender to a receiver;

responsive to receiving in any order the first and second reservation requests, the receiver reserving a resource of the one or more resources and transmitting an acknowledgement of the reservation to the sender;

the sender determining from the acknowledgement of the reservation whether the receiver has reserved the resource responsive to the first reservation request or to the second reservation request and further correlating the determined first or second reservation request with a first transaction request or a second transaction request, the second transaction request to be executed subsequent in order to the first transaction request; and responsive to determining that the reserved resource is reserved for the second transaction request and that a second resource of the one or more resources for the first transaction request is not reserved within a period of time and a deadlock condition exists, further comprising the receiver responsive to receiving instructions from the sender:

releasing the resource reserved for the second transaction request;

reserving the second resource for the first transaction request and transmitting a second acknowledgement of the reservation of the second resource; and executing the first transaction request using the reserved second resource.

In accordance with further embodiments of the present disclosure, there is provided a method of optimized streaming in a data processing system, the method comprising:

transmitting in any order first and second reservation requests for reservation of one or more resources over an un-ordered interconnect by a sender to a receiver;

responsive to receiving in any order the first and second reservation requests, the receiver reserving a resource of the one or more resources and transmitting an acknowledgement of the reservation to the sender;

the sender determining from the acknowledgement of the reservation whether the receiver has reserved the resource responsive to the first reservation request or to the second reservation request and further correlating the determined first or second reservation request with a first transaction request or a second transaction request, the second transaction request to be executed subsequent in order to the first transaction request;

responsive to determining that the reserved resource is reserved for the second transaction request, detecting whether the receiver also reserves within a period of time a second resource for the first transaction request;

when the receiver does not reserve the second resource for the first transaction request within the period of time, the receiver releasing the resource reserved for the second transaction request, reserving the second resource for the first transaction request and transmitting a second acknowledgement of the reservation of the second resource for the first transaction request;

the receiver executing the first transaction request using the reserved second resource and thereafter releasing the reserved second resource;

the sender transmitting to the receiver over the un-ordered interconnect a third reservation request to reserve a third resource for the second transaction request;

responsive to receiving the third reservation request, the receiver reserving the third resource for the second transaction request and transmitting a third acknowledgement of reservation of the third resource; and the receiver executing the second transaction request using the reserved third resource and thereafter releasing the reserved third resource.

Further, in accordance with certain embodiments of the present disclosure, there is provided a Sender device configured to transmit a plurality of transaction requests and a plurality of reservation requests in a data processing system, the Sender configured to transmit a plurality of transaction requests and a plurality of reservation requests in a data processing system, comprising:

a processor;

an outgoing requests element in communication with and controlled by the processor;

a deadlock detection element in communication with the processor; and a response detector in communication with the deadlock detection element and configured to receive incoming communications;

the outgoing requests element configured to transmit in any order first and second reservation requests for reservation of one or more resources needed for execution of first and second transaction requests, the second transaction request to be executed by a receiver subsequent in order to the first transaction request, responsive to receipt by the response detector of an acknowledgement of reservation of a resource, the deadlock detection element determines from the acknowledgment whether the resource is reserved responsive to the first reservation request or to the second reservation request and further correlates the determined first or second reservation request with a first transaction request or a second transaction request, responsive to determination by the deadlock detection element that the reserved resource is reserved for the second transaction request and that a second resource for the first transaction request is not reserved by the receiver within a period of time, the processor is configured to generate instructions to:

release the resource reserved for the second transaction request;

reserve the second resource for the first transaction request and transmit a second acknowledgement of the reservation of the second resource; and execute the first transaction request using the reserved second resource, and where the processor controls the outgoing requests element to transmit the instructions to the receiver.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Further, it will be appreciated that some or all functions described herein could be implemented by custom logic, such a state machine, that has no stored program instructions, in one or more application specific integrated circuits (ASICs), in reconfigurable logic such as an FPGA, or in one or more programmed processors having stored instructions. Of course, a combination of these approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such integrated circuits, software instructions and programs with minimal experimentation.

Moreover, those skilled in the art will appreciate that a program flow and associated data used to implement the embodiments described above can be implemented using various forms of storage such as Read Only Memory (ROM), Random Access Memory (RAM), Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present invention. Such alternative storage devices should be considered equivalents.

Various embodiments described herein are implemented using programmed processors executing programming instructions that are broadly described in flow chart form that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

Accordingly, some aspects and features of the disclosed embodiments are set out in the following numbered items:
1. A method of optimized streaming in a data processing system: the method comprising:
transmitting in any order first and second reservation requests for reservation of one or more resources over an un-ordered interconnect by a sender to a receiver;
responsive to receiving in any order the first and second reservation requests, the receiver reserving a resource of the one or more resources and transmitting an acknowledgement of the reservation to the sender;
the sender determining from the acknowledgement of the reservation whether the receiver has reserved the resource responsive to the first reservation request or to the second reservation request and further correlating the determined first or second reservation request with a first transaction request or a second transaction request, the second transaction request to be executed subsequent in order to the first transaction request; and responsive to determining that the reserved resource is reserved for the second transaction request and that a second resource of the one or more resources for the first transaction request is not reserved within a period of time and a deadlock condition exists, further comprising the receiver responsive to receiving instructions from the sender:
releasing the resource reserved for the second transaction request;
reserving the second resource for the first transaction request and transmitting a second acknowledgement of the reservation of the second resource; and
executing the first transaction request using the reserved second resource.
2. The method of item 1, where determining that the deadlock condition exists further comprises detecting that the receiver does not reserve the second resource for the first transaction request within the period of time.
3. The method of item 1, where prior to transmitting in any order the first and second reservation requests, the sender receiving the first and second transaction requests and establishing an ordering of the first and second transaction requests.
4. The method of item 1, where the period of time is tracked by a timer having a timeout value and further comprising the sender starting the timer in response to one or more of issuance of the first transaction request, issuance of the second transaction request, and the acknowledgement that indicates the resource is reserved for the second transaction request.
5. The method of item 1, where the period of time is tracked by a timer having a timeout value and where the timeout value is based on a fixed value, is programmable or is adaptive based upon hysteresis.
6. The method of item 1, further comprising when the receiver reserves the second resource for the first transaction request within the period of time:
the sender transmitting instructions to the receiver to execute the first transaction request using the second resource; and
the receiver executing the second transaction request using the resource in accordance with the transmitted instructions.
7. A method of optimized streaming in a data processing system, the method comprising:
transmitting in any order first and second reservation requests for reservation of one or more resources over an un-ordered interconnect by a sender to a receiver;
responsive to receiving in any order the first and second reservation requests, the receiver reserving a resource of the one or more resources and transmitting an acknowledgement of the reservation to the sender;
the sender determining from the acknowledgement of the reservation whether the receiver has reserved the resource responsive to the first reservation request or to the second reservation request and further correlating the determined first or second reservation request with a first transaction request or a second transaction request, the second transaction request to be executed subsequent in order to the first transaction request;
responsive to determining that the reserved resource is reserved for the second transaction request, detecting whether the receiver also reserves within a period of time a second resource for the first transaction request;
when the receiver does not reserve the second resource for the first transaction request within the period of time, the receiver releasing the resource reserved for the second transaction request, reserving the second resource for the first transaction request and transmitting a second acknowledgement of the reservation of the second resource for the first transaction request;

the receiver executing the first transaction request using the reserved second resource and thereafter releasing the reserved second resource;

the sender transmitting to the receiver over the un-ordered interconnect a third reservation request to reserve a third resource for the second transaction request;

responsive to receiving the third reservation request, the receiver reserving the third resource for the second transaction request and transmitting a third acknowledgement of reservation of the third resource; and the receiver executing the second transaction request using the reserved third resource and thereafter releasing the reserved third resource.

8. The method of item 7, where detecting whether the receiver also reserved within the period of time a second resource for the first transaction request further comprises:
the sender not receiving an acknowledgement of reservation of the second resource for the first transaction request; and
the receiver transmitting within the period of time acknowledgement of reservation of the second resource for the first transaction request.

9. The method of item 7, where the resource, the second resource, and the third resource are the same resource.

10. The method of item 7, the receiver releasing the resource reserved for the second transaction request responsive to receiving a cancel message from the sender.

11. The method of item 7, further comprising:
tracking the period of time by a timer having a timeout value based on a fixed value, a programmable value or an adaptive value based upon hysteresis.

12. The method of item 11, further comprising the sender starting the timer in response to one or more of issuance of the first transaction request, issuance of the second transaction request, and the acknowledgement that indicates the resource is reserved for the second transaction request.

13. The method of item 7, further comprising responsive to receiving the second acknowledgement:
the sender transmitting instructions to the receiver to execute the first transaction request using the reserved second resource.

14. The method of item 7, Further comprising responsive to receiving the third acknowledgement:
the sender transmitting instructions to the receiver to execute the second transaction request using the reserved third resource.

15. The method of item 7, when the receiver reserves the resource for the first transaction request within the period of time, further comprising:
the sender transmitting instructions to the receiver to execute the first transaction request using the resource; and
the receiver executing the second transaction request using the resource in accordance with the transmitted instructions.

16. The method of item 7, further comprising responsive to receiving the first transaction request and the subsequent second transaction request:
the sender transmitting reservation requests for the first and second resources over the unordered interconnect.

17. A sender device configured to transmit a plurality of transaction requests and a plurality of reservation requests in a data processing system, comprising:
a processor;
an outgoing requests element in communication with and controlled by the processor;
a deadlock detection element in communication with the processor; and
a response detector in communication with the deadlock detection element and configured to receive incoming communications;
the outgoing requests element configured to transmit in any order first and second reservation requests for reservation of one or more resources needed for execution of first and second transaction requests, the second transaction request to be executed by a receiver subsequent in order to the first transaction request,
responsive to receipt by the response detector of an acknowledgement of reservation of a resource, the deadlock detection element determines from the acknowledgment whether the resource is reserved responsive to the first reservation request or to the second reservation request and further correlates the determined first or second reservation request with a first transaction request or a second transaction request,
responsive to determination by the deadlock detection element that the reserved resource is reserved for the second transaction request and that a second resource for the first transaction request is not reserved by the receiver within a period of time, the processor is configured to generate instructions to:
  release the resource reserved for the second transaction request;
  reserve the second resource for the first transaction request and transmit a second acknowledgement of the reservation of the second resource; and
  execute the first transaction request using the reserved second resource, and
where the processor controls the outgoing requests element to transmit the instructions to the receiver.

18. The sender device of item 17, where prior to the outgoing requests element transmitting in any order the first and second reservation requests, the response detector receiving the first and second transaction requests and establishing the order of the second transaction request subsequent the first transaction request.

19. The sender device of item 17, where the deadlock detection element is configured to track the period of time with a timer having a timeout value based on a fixed value, a programmable value or an adaptive value based upon hysteresis.

20. The sender device of item 19, where the deadlock detection element is configured to start the timer in response to one or more of issuance of the first transaction request, issuance of the second transaction request, and the acknowledgement that indicates the resource is reserved for the second transaction request.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:
1. A method of optimized streaming in a data processing system, the method comprising:
transmitting in any order first and second reservation requests for reservation of one or more resources over an un-ordered interconnect by a sender to a receiver;
responsive to receiving in any order the first and second reservation requests, the receiver reserving a resource of the one or more resources and transmitting an acknowledgement of the reservation to the sender;
the sender determining from the acknowledgement of the reservation whether the receiver has reserved the resource responsive to the first reservation request or to the second reservation request and further correlating the determined first or second reservation request with a first transaction request or a second transaction request, the second transaction request to be executed by the sender subsequent in order to execution, by the sender, of the first transaction request; and
responsive to the sender determining that the reserved resource is reserved for the second transaction request and that a second resource of the one or more resources for the first transaction request is not reserved within a period of time and a deadlock condition exists, the sender transmitting instructions to the receiver;
responsive to instructions received from the sender, the receiver:
   releasing the resource reserved for the second transaction request and thereby breaking the deadlock condition; and
   reserving the second resource for the first transaction request and transmitting a second acknowledgement of the reservation of the second resource; and
responsive to the second acknowledgement received from the receiver, the sender executing the first transaction request using the reserved second resource; and
when the receiver reserves the second resource for the first transaction request within the period of time:
   the sender transmitting instructions to the receiver to execute the first transaction request using the second resource; and
   the receiver executing the second transaction request using the resource in accordance with the transmitted instructions.

2. The method of claim 1, where determining that the deadlock condition exists further comprises detecting that the receiver does not reserve the second resource for the first transaction request within the period of time.

3. The method of claim 1, further comprising, prior to transmitting in any order the first and second reservation requests, the sender receiving the first and second transaction requests and establishing an ordering of the first and second transaction requests.

4. The method of claim 1, where the period of time is tracked by a timer having a timeout value, the method further comprising the sender starting the timer in response to one or more of issuance of the first transaction request, issuance of the second transaction request, and the acknowledgement that indicates the resource is reserved for the second transaction request.

5. The method of claim 1, where the period of time is tracked by a timer having a timeout value and where the timeout value is based on a fixed value, is programmable or is adaptive based upon hysteresis.

6. A method of optimized streaming in a data processing system, the method comprising:
transmitting in any order first and second reservation requests for reservation of one or more resources over an un-ordered interconnect by a sender to a receiver;
responsive to receiving in any order the first and second reservation requests, the receiver reserving a resource of the one or more resources and transmitting an acknowledgement of the reservation to the sender;
the sender determining from the acknowledgement of the reservation whether the receiver has reserved the resource responsive to the first reservation request or to the second reservation request and further correlating the determined first or second reservation request with a first transaction request or a second transaction request, the second transaction request to be executed subsequent in order to the first transaction request;
responsive to determining that the reserved resource is reserved for the second transaction request, the sender detecting whether the receiver also reserves within a period of time a second resource for the first transaction request;
when the receiver does not reserve the second resource for the first transaction request within the period of time, the sender determining that a deadlock condition exists, and the receiver, responsive to control by the sender, releasing the resource reserved for the second transaction request, reserving the second resource for the first transaction request and transmitting a second acknowledgement of the reservation of the second resource for the first transaction request and thereby breaking the deadlock condition;
the receiver executing the first transaction request using the reserved second resource and thereafter releasing the reserved second resource;
the sender transmitting to the receiver over the un-ordered interconnect a third reservation request to reserve a third resource for the second transaction request;
responsive to receiving the third reservation request, the receiver reserving the third resource for the second transaction request and transmitting a third acknowledgement of reservation of the third resource; and
the receiver executing the second transaction request using the reserved third resource and thereafter releasing the reserved third resource; and
when the receiver reserves the resource for the first transaction request within the period of time, further comprising:
   the sender transmitting instructions to the receiver to execute the first transaction request using the resource; and
   the receiver executing the second transaction request using the resource in accordance with the transmitted instructions.

7. The method of claim 6, where detecting whether the receiver also reserved within the period of time a second resource for the first transaction request further comprises:
the sender not receiving an acknowledgement of reservation of the second resource for the first transaction request; and
the receiver not transmitting within the period of time acknowledgement of reservation of the second resource for the first transaction request.

8. The method of claim 6, where the resource, the second resource, and the third resource are the same resource.

9. The method of claim 6, the receiver releasing for the second transaction request responsive to receiving a cancel message from the sender.

10. The method of claim 6, further comprising:
tracking, by the sender, the period of time by a timer having a timeout value based on a fixed value, a programmable value or an adaptive value based upon hysteresis.

11. The method of claim 10, further comprising the sender starting the timer in response to one or more of issuance of the first transaction request, issuance of the second transaction request, and the acknowledgement that indicates the resource is reserved for the second transaction request.

12. The method of claim 6, further comprising responsive to receiving the second acknowledgement:
  the sender transmitting instructions to the receiver to execute the first transaction request using the reserved second resource.

13. The method of claim 6, further comprising responsive to receiving the third acknowledgement:
  the sender transmitting instructions to the receiver to execute the second transaction request using the reserved third resource.

14. The method of claim 6, further comprising responsive to receiving the first transaction request and the subsequent second transaction request:
  the sender transmitting reservation requests for the first and second resources over the unordered interconnect.

15. A sender device configured to transmit a plurality of transaction requests and a plurality of reservation requests in a data processing system, the sender device comprising:
  a processor;
  an outgoing requests element in communication with and controlled by the processor;
  a deadlock detection element in communication with the processor; and
  a response detector in communication with the deadlock detection element and configured to receive incoming communications;
  the outgoing requests element configured to transmit in any order first and second reservation requests for reservation of one or more resources needed for execution of first and second transaction requests, the second transaction request to be executed by a receiver subsequent in order to the first transaction request,
  responsive to receipt by the response detector of an acknowledgement of reservation of a resource, the deadlock detection element determines from the acknowledgment whether the resource is reserved responsive to the first reservation request or to the second reservation request and further correlates the determined first or second reservation request with a first transaction request or a second transaction request,
  responsive to determination by the deadlock detection element of the sender device that the reserved resource is reserved for the second transaction request and that a second resource for the first transaction request is not reserved by the receiver within a period of time, the processor of the sender device is configured to generate instructions to:
    release the resource reserved for the second transaction request and thereby break a deadlock condition detected by the deadlock detection element;
    reserve the second resource for the first transaction request and transmit a second acknowledgement of the reservation of the second resource; and
    execute the first transaction request using the reserved second resource, and
    responsive to a determination by the deadlock detection element of the sender device that the reserved resource is reserved within the period of time, further comprising:
      the sender transmitting instructions to the receiver to execute the first transaction request using the resource; and
      the receiver executing the second transaction request using the resource in accordance with the transmitted instructions,
  where the processor controls the outgoing requests element to transmit the instructions to the receiver.

16. The sender device of claim 15, where prior to the outgoing requests element transmitting in any order the first and second reservation requests, the response detector receiving the first and second transaction requests and establishing the order of the second transaction request subsequent the first transaction request.

17. The sender device of claim 15, where the deadlock detection element is configured to track the period of time with a timer having a timeout value based on a fixed value, a programmable value or an adaptive value based upon hysteresis.

18. The sender device of claim 17, where the deadlock detection element is configured to start the timer in response to one or more of issuance of the first transaction request, issuance of the second transaction request, and the acknowledgement that indicates the resource is reserved for the second transaction request.

* * * * *